(12) United States Patent
Hong et al.

(10) Patent No.: US 6,205,132 B1
(45) Date of Patent: Mar. 20, 2001

(54) METHOD FOR ACCESSING A CELL USING TWO PILOT CHANNELS IN A CDMA COMMUNICATION SYSTEM OF AN ASYNCHRONOUS OR QUASI-SYNCHRONOUS MODE

(75) Inventors: Een Kee Hong; Dong Ho Kim; Yeon Dae Yang; Byeong Chul Ahn; Yong Wan Park; Seong Moon Ryu; Tae Young Lee; An Na Choi, all of Seoul (KR)

(73) Assignee: Korea Mobile Telecommunications Corp. (KR)

( * ) Notice: Subject to any disclaimer, the term of this patent is extended or adjusted under 35 U.S.C. 154(b) by 0 days.

(21) Appl. No.: 08/803,995

(22) Filed: Feb. 21, 1997

(30) Foreign Application Priority Data

Feb. 22, 1996 (KR) .................................... 96-4236
Feb. 22, 1996 (KR) .................................... 96-4398

(51) Int. Cl.[7] ............................... H04B 7/216; H04J 3/06
(52) U.S. Cl. ............................................ 370/342; 370/350
(58) Field of Search .................................. 370/320, 331, 370/335, 342, 349, 350, 355, 548, 519, 324, 332, 338; 455/422, 436, 438, 442, 450, 455, 444, 449, 502, 560, 513, 456, 556, 566, 437; 375/200, 206, 208

(56) References Cited

U.S. PATENT DOCUMENTS

| | | | |
|---|---|---|---|
| 5,280,472 | * | 1/1994 | Gilhousen et al. ................. 370/335 |
| 5,353,332 | * | 10/1994 | Raith et al. ........................ 455/455 |
| 5,491,717 | * | 2/1996 | Hall ................................... 375/205 |
| 5,548,808 | * | 8/1996 | Bruckert et al. ................... 455/33.2 |
| 5,577,022 | * | 11/1996 | Padovani et al. .................. 370/332 |
| 5,640,414 | * | 6/1997 | Blakeney, II et al. ............. 375/200 |
| 5,694,388 | * | 12/1997 | Sawahashi et al. ................ 370/335 |
| 5,697,055 | * | 12/1997 | Gilhousen et al. ................. 455/436 |
| 5,778,316 | * | 7/1998 | Persson et al. .................... 455/434 |

* cited by examiner

Primary Examiner—Chau Nguyen
Assistant Examiner—Chiho Andrew Lee
(74) Attorney, Agent, or Firm—Blakely, Sokoloff, Taylor & Zafman

(57) ABSTRACT

The present invention discloses a method for accessing a cell, and more particularly, to a method for acquiring an initial synchronization using two pilot channels in a CDMA (Code Division Multiple Access) communication system of an asynchronous or quasi-synchronous mode. In accordance with the present invention, a CDMA communication system of an quasi-synchronous mode comprises the steps of synchronizing the mobile station with a cluster pilot, and searching for cell pilots on the basis of the cluster synchronization channel set up by the cluster pilot, and synchronizing the mobile station with the cell pilot having a maximum sensitivity, whereby the mobile station is synchronized with the base station through the cluster pilot and the cell pilot. Also, in accordance with the present invention, a CDMA communication system of a asynchronous mode comprises the steps of synchronizing the mobile station with a cluster pilot, and searching for all cell pilots in a cluster of which synchronization has been set up by the cluster pilot, and synchronizing the mobile station with the cell pilot having a maximum sensitivity, whereby the mobile station is synchronized with the base station through the cluster pilot and the cell pilot.

11 Claims, 11 Drawing Sheets

METHOD FOR ACCESSING A CELL USING TWO PILOT CHANNELS IN A CDMA COMMUNICATION SYSTEM OF AN ASYNCHRONOUS OR QUASI-SYNCHRONOUS MODE

BACKGROUND OF THE INVENTION

1. Field of the Invention

The present invention relates to a method for accessing a cell, and more particularly, to a method for acquiring an initial synchronization using two pilot channels in a CDMA (Code Division Multiple Access) communication system of an asynchronous or quasi-synchronous mode.

2. Description of the Related Art

In general, in the microcell environment having a plurality of base stations, since expensive equipment such as GPS (Global Positioning System) is required in each base station, the cost can be quite high. Also, in the case where the base station is set up in an underground space and room, the use of the GPS equipment has many technical difficulties.

Further, in the CDMA communication system, which is employed according to the timing information outside a restricted area, a system capable of being independently operated may be required because there is no method for coping with troubles in the GPS and with an intentional information intercept caused by the system operator. For example, the CDMA communication system, which can be operated without the use of the GPS, has been developed by some companies in Europe and Japan. However, there still remains many unsolved problems. FIG. 1 is a schematic view illustrating a method of discriminating a base station of the reception frequency using the conventional time offset.

In the conventional CDMA communication system (IS-95™) or wideband CDMA communication system, each of the base stations obtains the exact timing information from the GPS and then all the base stations operate in s synchronous mode. In this case, as shown in FIG. 1, each base station may be discriminated by the time offset of the same PN (Pseudo Noise) sequence. By doing so, 320 and 512 base stations may be discriminated with the time offset 62.5 $\mu$sec and 52.1 $\mu$sec, respectively.

For example, each base station of IS-95™, which has the PN sequence length 32768 and the chip rate 1.2288 Mcps, is discriminated with the time offset by a 64-chip (64×1/1.2288 M=52.1 $\mu$sec), and each base station of "OKI" company, which has the PN sequence length 81920 and the chip rate 4.096 Mcps, is discriminated with the time offset by a 256-chip (256×1/4.096 M=62.5 $\mu$sec).

As stated above, since it is possible to discriminate hundreds of base stations, the CDMA communication system has the advantage in that a designed can lighten the burden on the system design.

FIG. 2 is a schematic view illustrating a cell structure of the analogue cellular system and the time division multiple access (TDMA) system in the case of the reuse of seven frequency bands in accordance with the conventional communication system.

In the analogue cellular system and the TDMA system, only a few base stations may be discriminated because the base stations are discriminated by frequency. Accordingly, as shown in FIG. 2, some of the frequency bands must be used again. In this case, designers should lay a scheme capable of decreasing the interference between the base stations, using the same frequency. However, this scheme may impose a heavy burden on the designers because the propagation environment and the lay of the land have effects on the radio wave in communication.

For each base station to use time offsets different from each other, all the base stations must have the exact timing information between them. In particular, if the inaccuracy of the timing information is larger than the time offset, it is not possible to discriminate each of the base stations. Accordingly, in IS-95 and OKI, an exact synchronization between the base stations is obtained by the GPS. A communication system based on the GPS has many problems in its system stability and costs.

Therefore, a synchronous mode, which operates without the exact external timing information, is required between base stations. The present invention provides a method for using the timing information transmitted by a conventional wire or wireless network instead of the exact external timing information in the GPS.

The timing information transmitted by a conventional wire or wireless network is very inaccurate. Therefore, in the case where the base stations are discriminated using this timing information, the time offset between the base stations must be much larger than the inaccuracy of the timing information. However, this has a problem in that the time offset to discriminate the base stations decreases in number. On the other hand, in the case where the time offset increases in number, it requires lot of time in the initial synchronization.

Now, in the paging system, a synchronization between the base stations is set up using the timing information through a network because all the base stations must transmit signals at the same time. At this time, due to the distance between the base stations, time delay in network transmission lines and the processing time in modems transmitting and receiving signals, the inaccuracy of the synchronization between the base stations increases in time up to hundreds of microsends.

In the case where a plurality of base stations are discriminated by the time offset of the same PN code and the synchronization between the base stations is set up by a wire or wireless network, the base station is discriminated, in consideration of the time delay in the delay elements such as the transmission lines in each base station, by the time offset larger than the value having the largest inaccuracy. Also, since this value is not a fixed value, a large number of measurement data may be required. Furthermore, in the case where the system synchronization is abruptly unstable, the base stations may be not discriminated.

In the case where the exact timing information is not used, it is difficult to discriminate the base stations through the time offset of the same sequence. Accordingly, in Europe, the CODIT system), pursuing an asynchronous mode between the base stations, the discrimination between the base stations is achieved by allocating different sequences to each base station instead of the time offset of the same sequence. Although the base stations are not synchronized with each other, the base stations may be discriminated in the method of discriminating the base stations using the sequences different from each other.

However, in such cases, it takes the user a lot of time to acquire the code of a base station. In the case of IS-95 or OKI, since all base stations use the same sequence, the sequence of the base station may be acquired by performing the initial synchronization for only one sequence, but it is actually impossible to discriminate the base stations through the different sequences because the initial synchronization for all sequences must be performed.

A method to solve this problem is to set a limit to the number of sequences and to reuse the sequence as shown in FIG. 3 which is a schematic view illustrating a cell structure of the CDMA system in case of the reuse of seven frequency bands in accordance with the conventional communication system. However, this method has a problem in that it is impossible to easily lay a scheme of cells.

On the other hand, as stated above, the system, which obtains an exact synchronization using the GPS, has considerable problems in the system stability and costs.

Accordingly, a synchronous mode, which operates without the exact external timing information, is required between base stations.

The CODIT system in Europe or the NTT DoCoMo system in Japan makes researches in methods capable of being operated without exact synchronization information between the base stations, and not by using external timing information. To accomplish this purpose, only a method is to allocate different sequences to each base station, because the timing information is not known between the base stations, and then the base stations can not discriminate the time offset of the same sequence.

However, when the mobile station attempts an initial synchronization, the mobile station searches for only one sequence in the case where a mobile station uses the time offset of the same sequence, but in the case where the time offset is divided into different sequences, the mobile station searches for all the sequences. In the current digital cellular communication system, an initial synchronization is performed within a few seconds, but in the case where the mobile station is discriminated by the different sequences, the initial synchronization is performed for a long time. This means that the user waits for a few tens of seconds after dialing, it is impossible to apply this method to an actual communication service.

A method to solve this problem is also to set a limit to the number of sequences and to reuse the sequence as shown in FIG. 3. However, this method has a problem in that it is impossible to easily lay a scheme of cells, as stated above.

SUMMARY OF THE INVENTION

An object of the present invention is to provide a method for accessing cells using two pilot channels so as to acquire a fast initial synchronization.

Another object of the present invention is to provide a method for accessing cells capable of easily laying a scheme of cells, using a plurality of sequences for discriminating base stations.

According to the present invention, in a CDMA communication system including base stations, a base station controller and mobile stations, and discriminating the base stations by using different sequences, wherein the base station receives a synchronization signal from the base station controller, there is provided a method, for accessing a cell, comprising the steps of: synchronizing the mobile station with a cluster pilot; and searching for cell pilots on the basis of the cluster synchronization channel set up by the cluster pilot, and synchronizing the mobile station with the cell pilot having a maximum sensitivity, whereby the mobile station is synchronized with the base station through the cluster pilot and the cell pilot.

Also, according to the present invention, in a CDMA communication system including base stations, a base station controller and mobile stations, and discriminating the base stations using different sequences, there is provided a method, for accessing a cell, the method comprising the steps of: synchronizing the mobile station with a cluster pilot; and searching for all cell pilots in a cluster of which synchronization has been set up by the cluster pilot, and synchronizing the mobile station with the cell pilot having a maximum sensitivity, whereby the mobile station is synchronized with the base station through the cluster pilot and the cell plot.

BRIEF DESCRIPTION OF THE DRAWINGS

Other objects and aspects of the invention will become apparent from the following description of embodiments with reference to the accompanying drawings, in which.

DETAILED DESCRIPTION OF THE PREFERRED EMBODIMENTS

Hereinafter, an embodiment according to the present invention will be described in detail referring to FIGS. 4 to 11.

Figure 1:
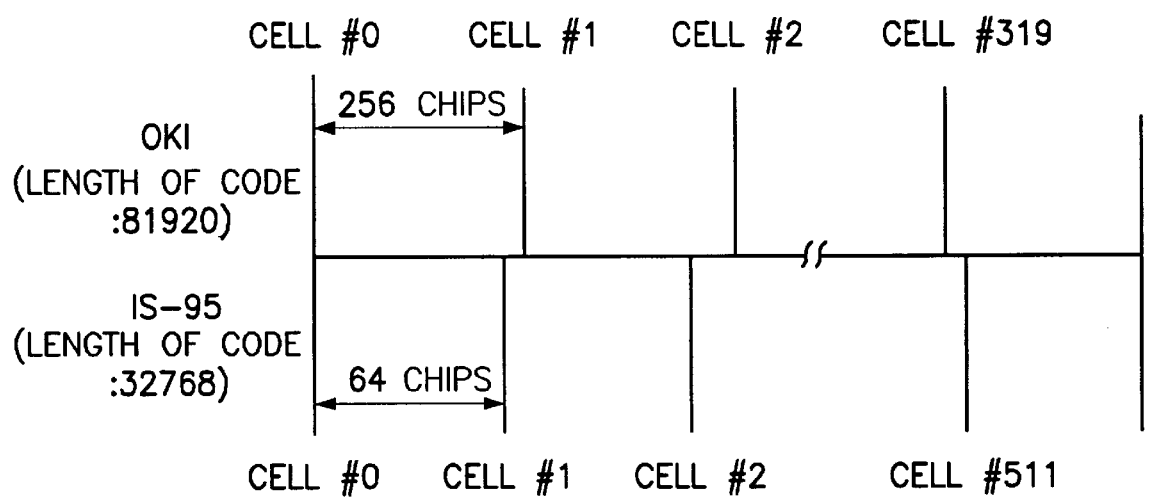
FIG. 1 is a schematic view illustrating a method of discriminating a base station of the reception frequency using the conventional time offset.
Figure 2:
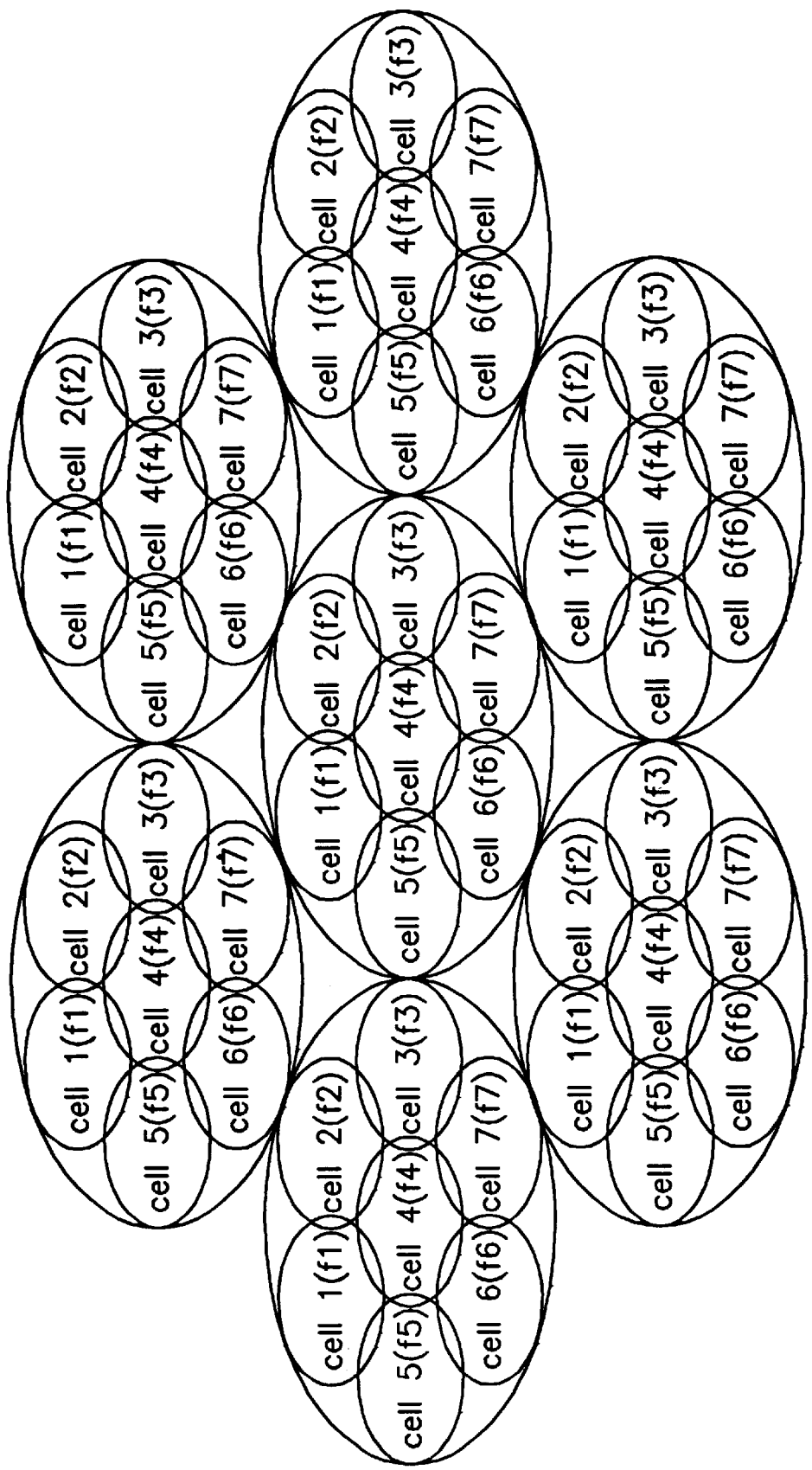
FIG. 2 is a schematic view illustrating a cell structure or the analogue cellular system and the time division multiple access (TDMA) system in the case of the reuse of seven frequency bands in accordance with the conventional communication system.
Figure 3:
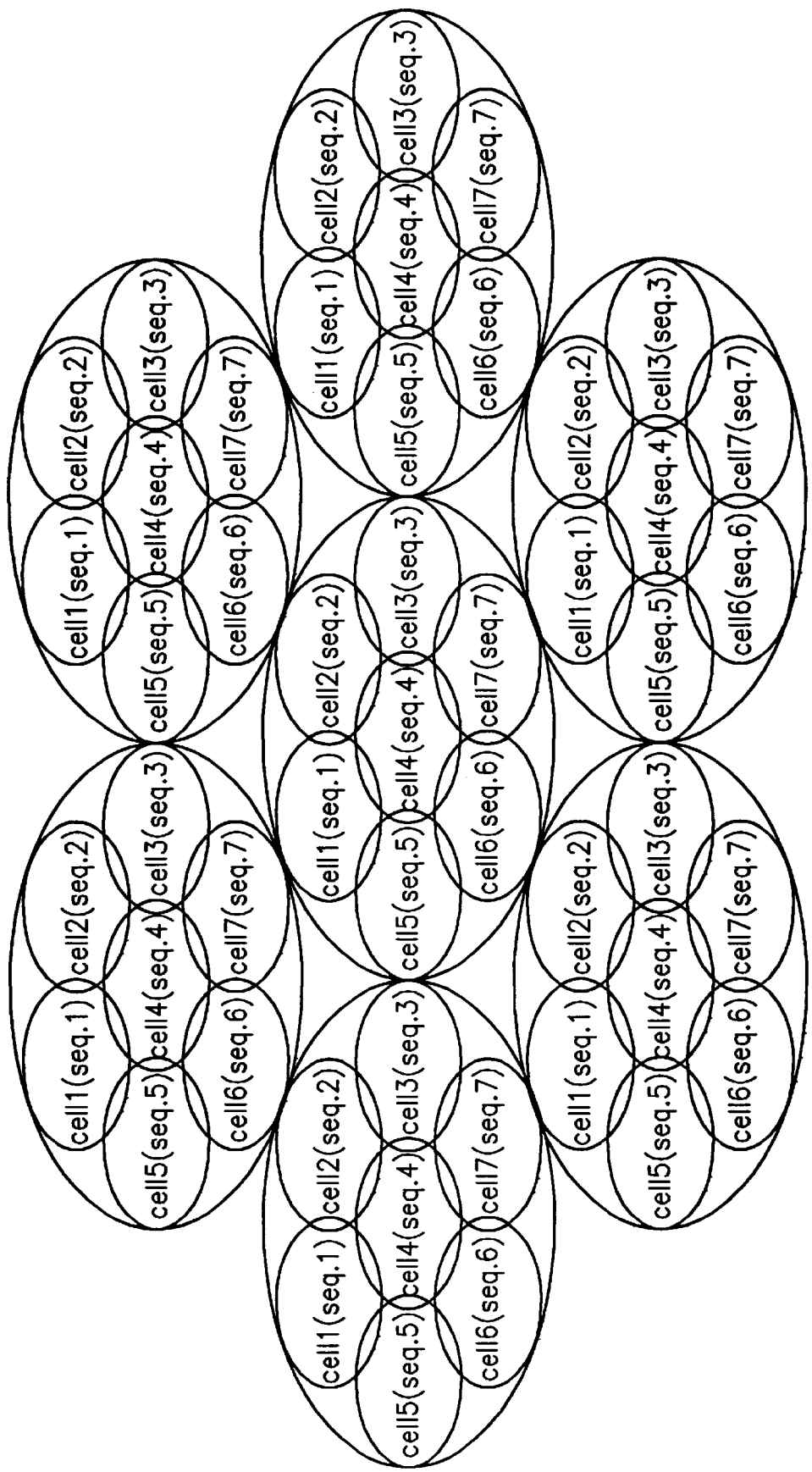
FIG. 3 is a schematic view illustrating a cell structure of the CDMA communication system in the case of the reuse of seven frequency bands in accordance with the conventional communication system.
Figure 4:
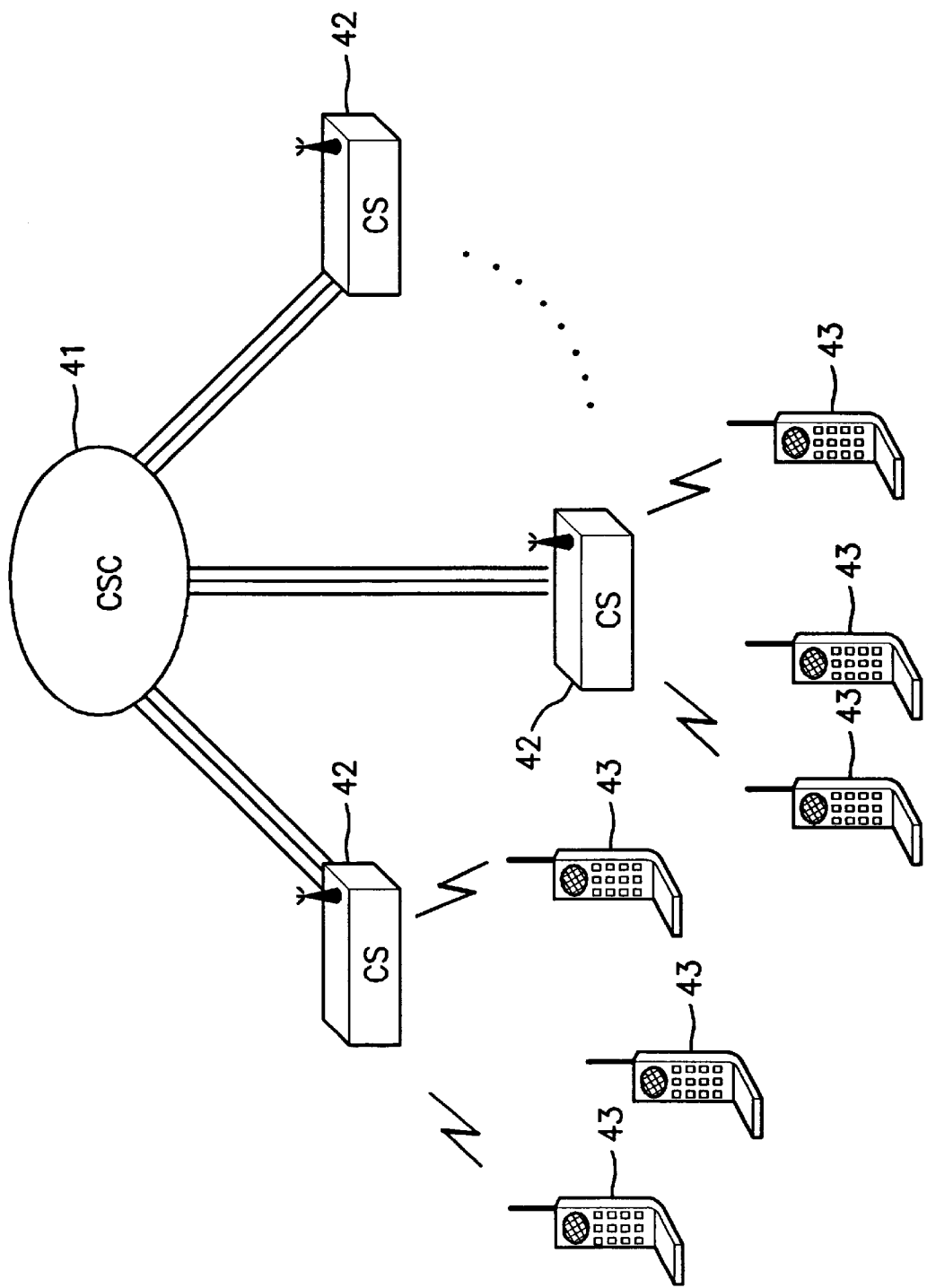
FIG. 4 is a schematic view illustrating a structure of the base station in the CDMA communication system in accordance with the present invention.

First, FIG. 4 is a schematic view illustrating a structure of the base station in the CDMA communication system in accordance with the present invention, in which the reference numerals 41, 42 and 43 denote a base station controller, a base station and a mobile station, respectively.

As shown in FIG. 4, a plurality of mobile stations 43 are accessed to base stations 42 and the base stations 42 are accessed to a base station controller 41. According to the present invention, one cluster is made up of cells accessed to one base station controller 41.

In the CDMA communication system of a quasi-synchronous mode, the base station controller 41 is accessed to the base station 42 by a wire or wireless network and the base station controller 41 transmits a synchronization signal to each base station 42. At this time, since the distance between the base station controller 41 and each base station 42 and the features on this transmission line thereof are different from each other, the correction of the synchronization is continuously carried out through a number of measurements.

Figure 5:
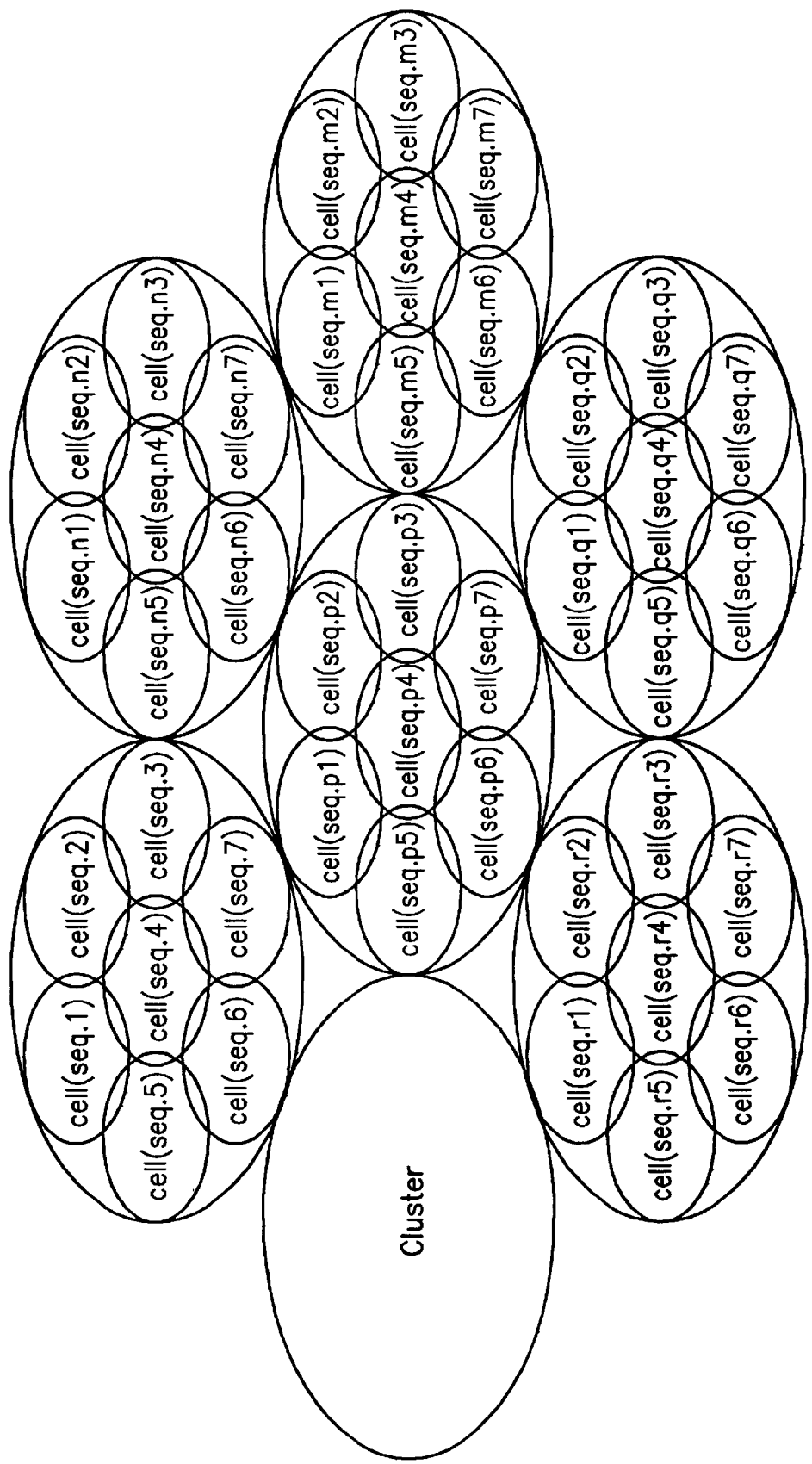
FIG. 5 is a schematic view illustrating a cell structure of the CDMA communication systems to use two pilots in accordance with the present invention.

FIG. 5 is a schematic view illustrating a cell structure of the CDMA communication system to use two pilots in accordance with the present invention. As shown in FIG. 5, some cells may form one cluster. In this case, all cells associated with the same cluster use the same pilot channel, and each cell in the cluster are divided into a cell pilot. When the mobile station sets up a call, the mobile station accesses the cluster pilot before it accesses the cell pilot (pilot in conventional method).

The reason why the mobile station accesses the cluster pilot is that it takes a lot of time to search for all kinds of the sequences for a given time without the time offset of the sequence of the current base station or information associated with them, and also it is impossible in actual fact.

Accordingly, after the mobile station doesn't search for the sequence of all cells, and first, searches for the cluster pilots in which some sequences are reused and then obtains the cluster pilot, the mobile station reads the kinds of the cells in the current cluster through a cluster synchronization channel and makes a search for only them. Since the cluster pilot reuses some sequences, the number of sequences the mobile station searches for may be fairly decreased.

In the CDMA communication system of a quasi-synchronization mode, once the mobile station accesses the cluster pilot, it searches for only cell pilots for the time which the network insures because the cells are synchronized with one another through the network.

For example, in IS-95 capable of discriminating 512 cells, if 16 sequences are reused and the number of cells in each cluster is the same, the number of cells is each cluster is 32. Accordingly, the mobile station searches for 16 sequences, finds its own cluster, and searches for the sequences corresponding to 32 cells. As a result, the mobile station searches for only 48 sequences, instead of 512 sequences.

Also in the CDMA communication system of a quasi-synchronization mode, in the case where the mobile station searches for the cell pilots after searching the cluster pilot, there is no need to search the entire length of each sequence because the synchronization information transmitted by a wire or wireless network exists between the cells. As a result, since the mobile station uses this synchronization information, it may not take a lot of time in the initial synchronization.

Since some sequences are reused in the cluster, an elaborate scheme may be required when the clusters are arranged. However, the interference between the clusters may be decreased, by making the size of the cluster large. Furthermore, in the case of the cell arrangement and the establishment of new cells, it is possible to easily lay a scheme of cells because only the sequence is added to the cluster synchronization channel.

Continuously, multicell and single cell structures according to the present invention will be described in detail.

First, a multi-layer structure will be described in detailed.

The multi-layer structure is a structure in which a macrocell for the current digital cellular system and a microcell for the personal communication system exist together. That is to say, the microcell having a small radius of cell is suitable for a pedestrian at low speed and indoor environment, but for a subscriber moving at high speed, the macrocell having a large radius of cell is suitable because of the frequent hand-over. Accordingly, to provide various services the multi-layer structure, in which several cells exist together, would be required and the multi-layer structure will be considered in the mobile communication service in the future. In the multi-layer structure, different frequency bands are typically used because the interference is produced between the microcell and the macrocell.

According to the present invention, the system using two pilots is suitable for the multi-layer structure. That is, if the cluster is considered as a macrocell and each cell in the cluster is considered as a microcell, the mobile station first finds the macrocell pilot, and reads the kinds of the sequences of the microcells, and then is accessed to the microcell.

Figure 6:
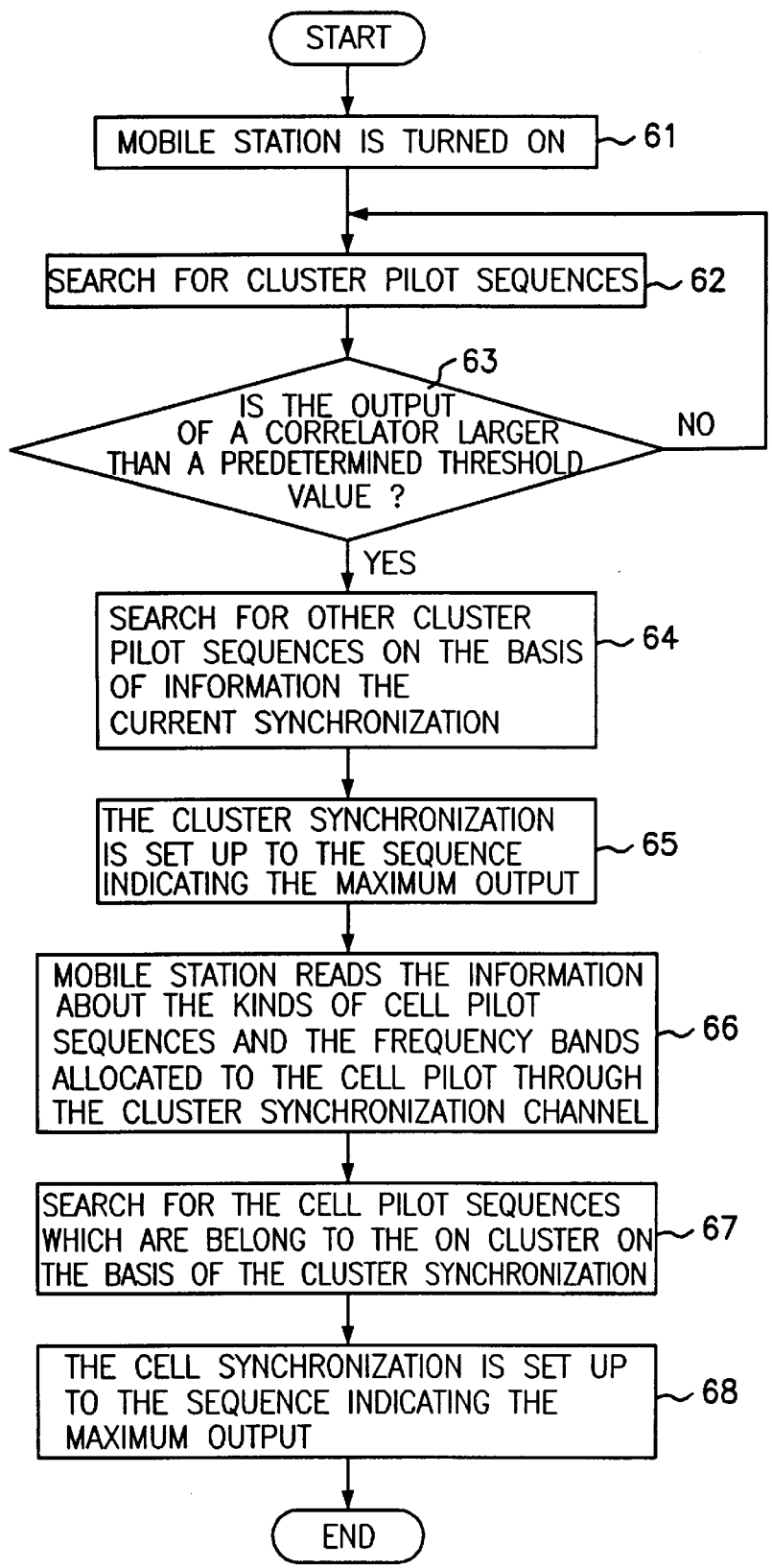
FIG. 6 is a flow chart illustrating a cell access in a multi-layer structure in accordance with an embodiment of the present invention.

FIG. 6 is a flow chart illustrating a cell access in a multi-layer structure in accordance with an embodiment of the present invention. As shown in FIG. 6, after the power of the mobile station is turned on (at step 61) and the mobile station searches for the cluster pilot sequences (at step 62), the mobile station determines whether the output from a correlator is larger than a given threshold value (at step 63). If the output from a correlator is smaller than the threshold value, the mobile station continuously searches for the cluster pilot sequences. On the other hand, if the output from a correlator is larger than the threshold value, the mobile station searches for other cluster pilot sequences on the basis of the current synchronization information (at step 64). At this time, since the synchronization is set up between the clusters through a wire or wireless network, the mobile station may search only an inaccurate range before and after a point of time of the current synchronization when it searches for other cluster pilot sequences.

After searching for the cluster pilot sequences, the cluster synchronization is set up to the pilot sequence indicating the maximum output (at step 65).

The cell pilot information, which includes the kinds of the sequences of the cells which is the cluster and the information about the frequency band in which the pilot information is managed, is transmitted to the cluster synchronization channel. In the multi-layer structure, since the cluster pilot and the cell pilot operate at the frequency bands different from each other, the information about the frequency band allocated to the cell pilot is required.

Accordingly, the mobile station reads the information about the kinds of cell pilot sequences and the frequency bands allocated to the cell pilot through the cluster synchronization channel (at step 66).

The mobile station searches for the cell pilot sequences which belong to the cluster on the basis of the current synchronization, using this cell pilot information (at step 67). In the same manner, since the synchronization is set up between the cells through a wire or wireless network, the mobile station may search only an inaccurate range before and after a point of time of the current synchronization.

The mobile station is accessed to the cell by searching for the cell sequences in the cluster on the basis of the current synchronization and setting up the cell synchronization to the cell sequence indicating the maximum output (at step 68).

Next, a single cell structure will be described in detail. There are two methods in the single cell structure of the present invention using two pilots, one of which is to set up a system transmitting the cluster pilot in the center of the cluster or is for the cell in the center of the cluster to transmit the cluster pilot, and the other of which is for each cell to simultaneously transmit the cluster and cell pilots.

The first method has an advantage in that each cell doesn't transmit the cluster pilot, and the second method, although each cell transmits the cluster pilot, has an advantage in that a burden on the initial sycnrhonization is lightened since the cluster pilot and the cell pilot are exactly synchronized with the base station.

Figure 7:
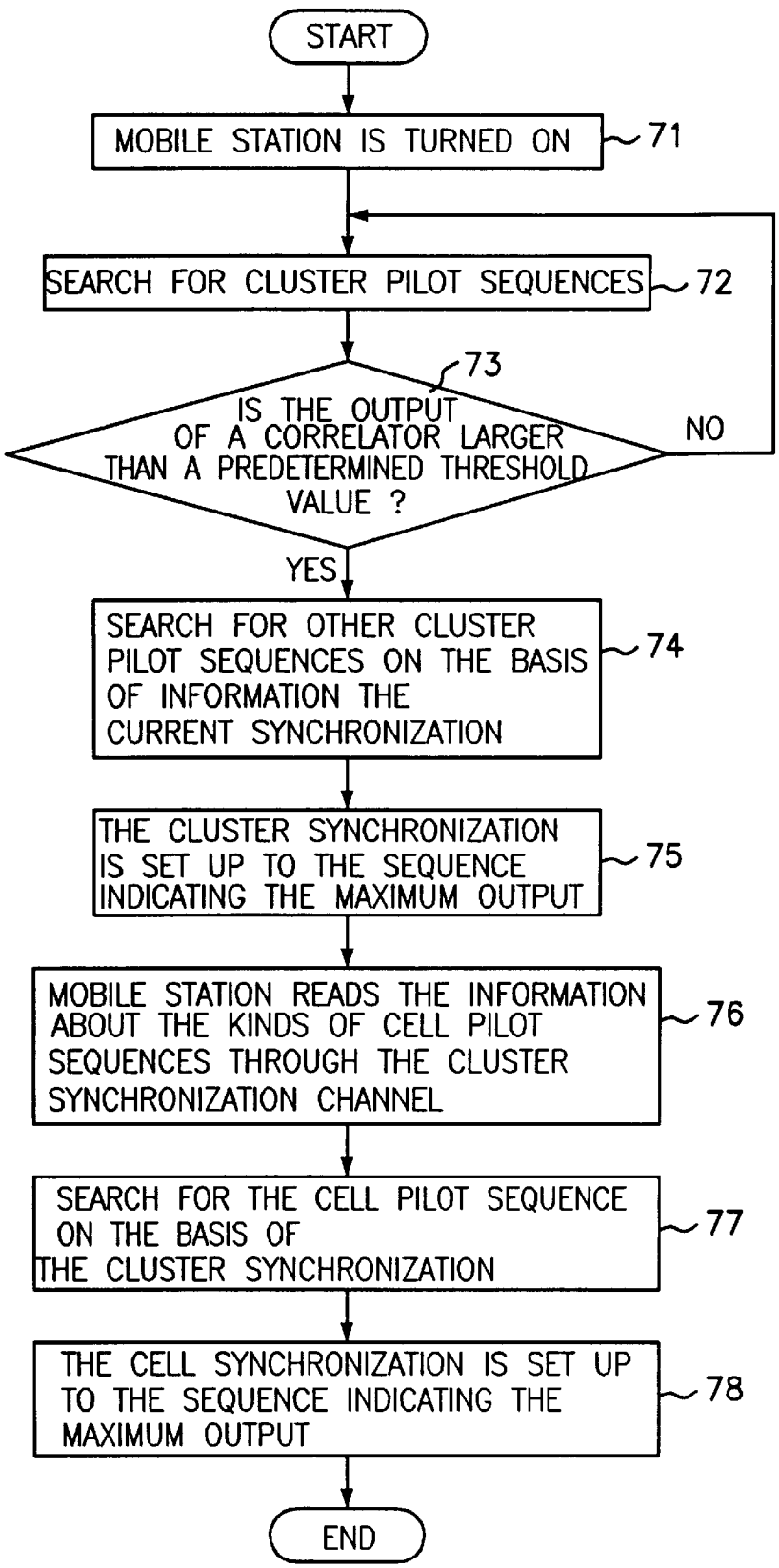
FIG. 7 is a flow chart illustrating a cell access, in the case where a cluster pilot is transmitted from a cell in the center of the cluster, in accordance with an embodiment of the present invention.

FIG. 7 is a flow chart illustrating a cell access, in the case where a cluster pilot is transmitted in the center of the cluster, in accordance with an embodiment of the present invention.

To transmit the cluster pilot in the center of the cluster, a system transmitting the cluster pilot in the center of the cluster is set up or the cell in the center of the cluster transmits the cluster pilot.

As shown in FIG. 7, after the power of the mobile station is turned on (at step 71) and the mobile station searches for the cluster pilot sequences (at step 72), the mobile station determines whether the output from a correlator is larger than a given threshold value (at step 73). If the output from a correlator is smaller than the threshold value, the mobile station continuously searches for the cluster pilot sequences. On the other hand, if the output from a correlator is larger than the threshold value, the mobile station searches for other cluster pilot sequences on the basis of the current synchronization information (at step 74). At this time, since the synchronization is set up between the clusters through a wire or wireless network, the mobile station may search only an inaccurate range before and after a point of time of the current synchronization when it searches for other cluster pilot sequences.

After searching for the cluster pilot sequences, the cluster synchronization is set up to the pilot sequence indicating the maximum output (at step 75).

The cell pilot information, which includes the kinds of the sequences of the cells which is in the cluster, is transmitted to the cluster synchronization channel.

Accordingly, the mobile station reads the information about the kinds of cell pilot sequences through the cluster synchronization channel (at step 76).

The mobile station searches for the cell pilot sequences on the basis of the current synchronization, using this cell pilot (at step 77). In the same manner, since the synchronization is set up between the cells through a wire or wireless network, the mobile station may search only an inaccurate range before and after a point of time of the current synchronization.

The mobile station is accessed to the cell by searching for the cell sequences in the cluster on the basis of the current synchronization and setting up the cell synchronization to the cell sequence indicating the maximum output (at step 78).

Figure 8:
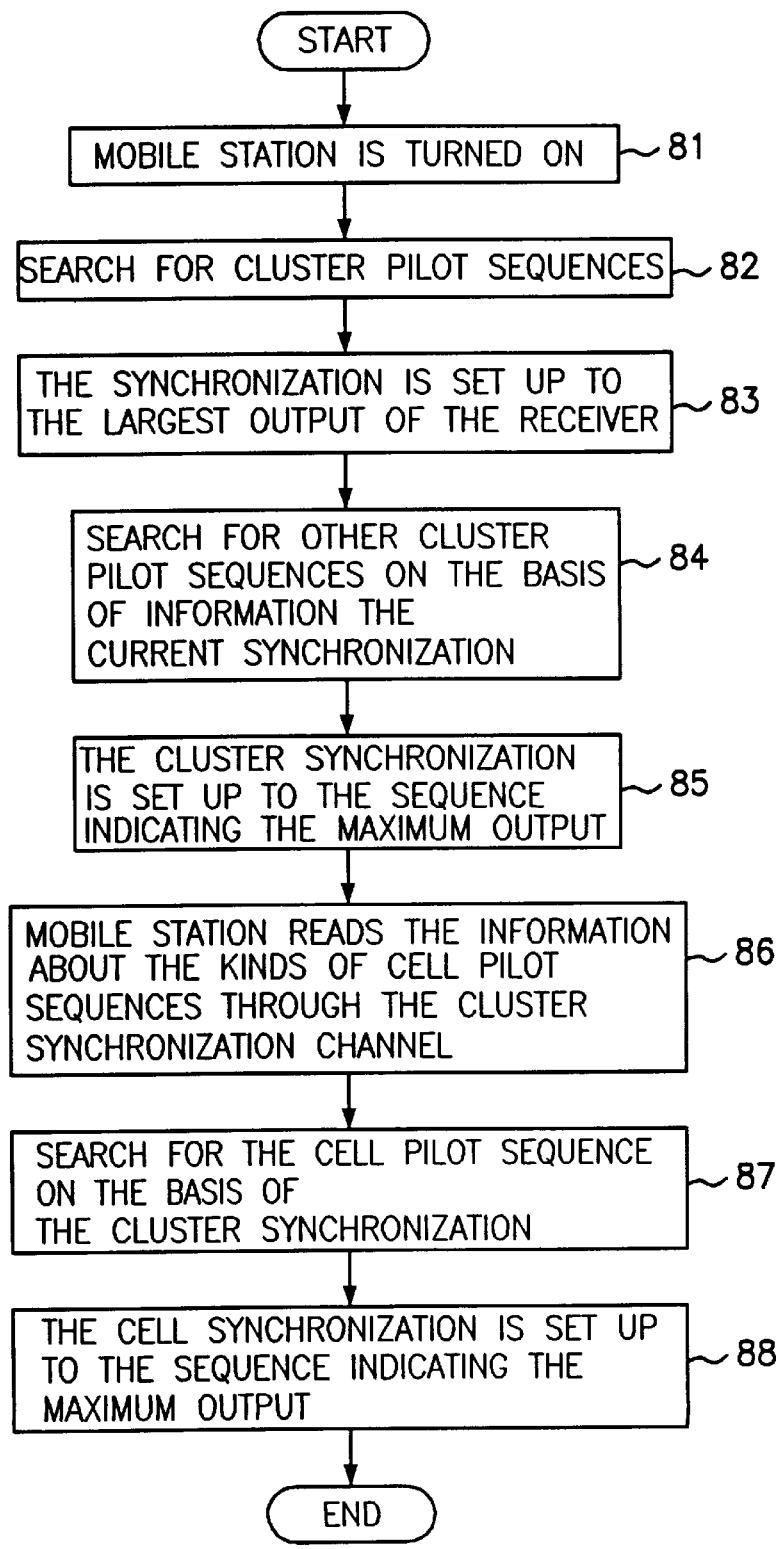
FIG. 8 is a flow chart illustrating a cell access, in the case where all cells transmit a cluster pilot and a cell cluster, in accordance with an embodiment of the present invention.

FIG. 8 is a flow chart illustrating a cell access, in the case where all cells transmit a cluster pilot and a cell cluster, in accordance with an embodiment of the present invention.

As shown in FIG. 8, the power of the mobile station is turned on (at step 81) and the mobile station searches for the cluster pilot sequences (at step 82). At this time, if the output from a correlator (the output from a correlator) is larger than a given threshold value, the mobile station doesn't immediately search for other cluster sequences but it must search only an inaccurate range of the network synchronization with respect to the same cluster pilot sequence. Since all cells in the cluster transmit one cluster pilot and a plurality of outputs may be larger than a given threshold value, a point of time of the current synchronization is set up to the largest output of the correlator (at step 83). The mobile station searches for other cluster pilot sequences on the basis of the current synchronization information (at step 84). At this time, since the synchronization is established between the clusters through a wire or wireless network, the mobile station may search only an inaccurate range before and after a point of time of the current synchronization when it searches for other cluster pilot sequences.

After searching for the cluster pilot sequences, the cluster sycnrhonization is set up to the pilot sequence indicating the maximum output (at step 85).

The cell pilot information, which includes the kinds of the sequences of the cells which is in the cluster, is transmitted to the cluster sycnrhonization channel.

Accordingly, the mobile station reads the information about the kinds of cell pilot sequences though the cluster synchronization channel (at step 86).

The mobile station searches for the cell pilot sequences on the basis of the current synchronization, using this cell pilot (at step 87). In this case, because each cell transmits the cluster pilot and the cell pilot, a point of time of the cluster pilot synchronization has been the same as that of the cell pilot synchronization so that the cell pilots are searched for with respect to a point of time of the cluster synchronization.

The mobile station is accessed to the cell, by searching for the cell sequences the cluster on the basis of the current synchronization and setting up the cell sycnrhonization to the cell sequence indicating the maximum output (at step 88).

Figure 9:
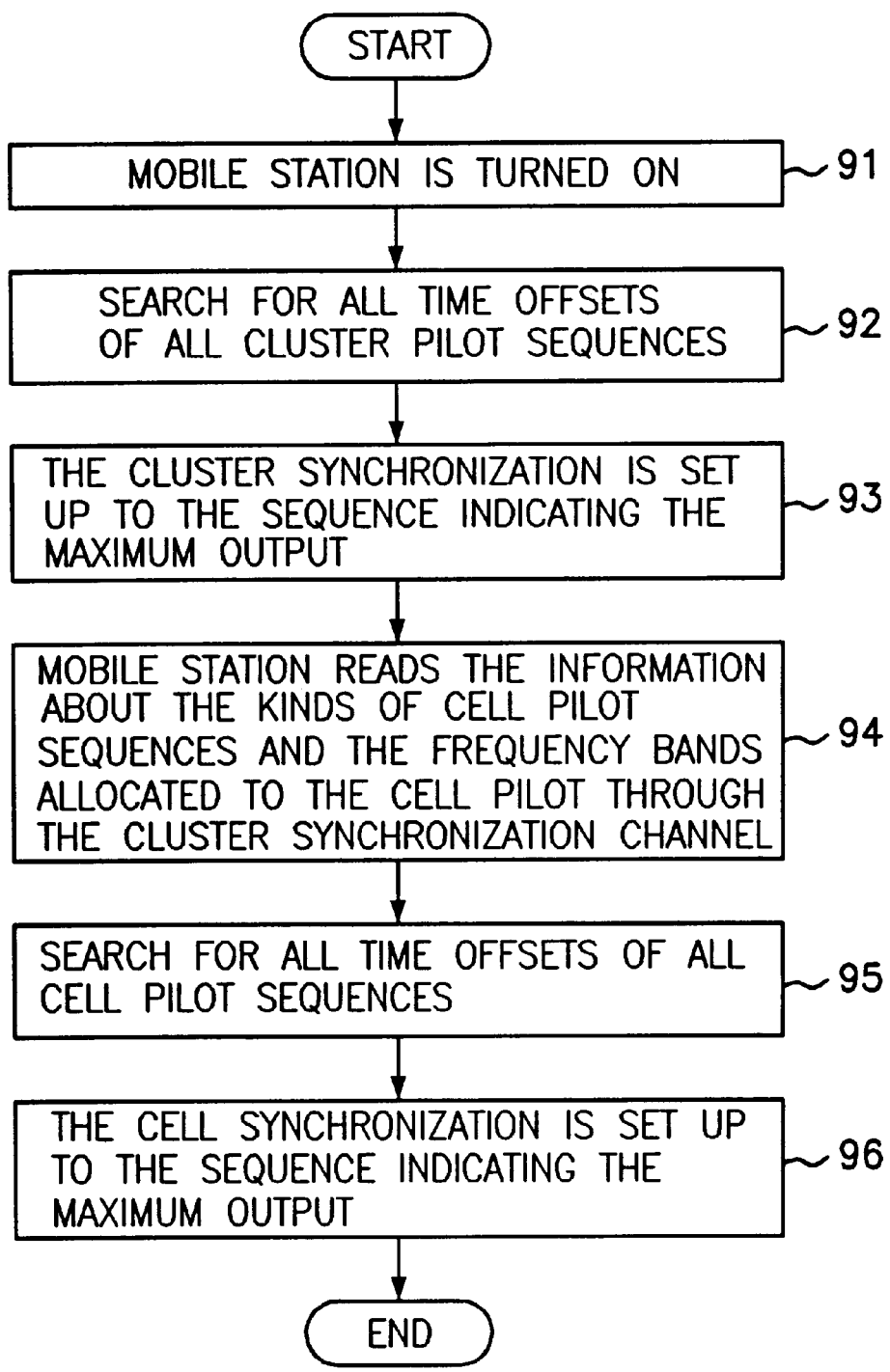
FIG. 9 is a flow chart illustrating a cell access in a multi-layer structure in accordance with another embodiment of the present invention.

FIG. 9 is a flow chart illustrating a cell access in a multi-layer structure in accordance with another embodiment of the present invention. As shown in FIG. 9, the power of the mobile station is turned on (at step 91) and the mobile station searches for all time offsets of all cluster pilot sequences (at step 92), so that a point of time of the current synchronization is set up to the sequence indicating the largest output (at step 93).

The cell pilot information, which includes the kinds of the sequences of the cells which are in the cluster and the information about the frequency band in which the pilot information is managed, is transmitted to the cluster synchronization channel. In the multi-layer structure, since the cluster pilot and the cell pilot are operated at frequency bands different from each other, the information about the frequency band allocated to the cell pilot is required.

Accordingly, the mobile station reads the information about the kinds of cell pilot sequences and the frequency bands allocated to the cell pilot though the cluster sycnrhonization channel (at step 94).

Next, the mobile station searches for all time offsets of all cluster pilot sequences in the cluster of which synchronization is set up, using this cell pilot information (at step 95), and then the cell synchronization is set up to the sequence indicating the maximum output (at step 96).

Figure 10:
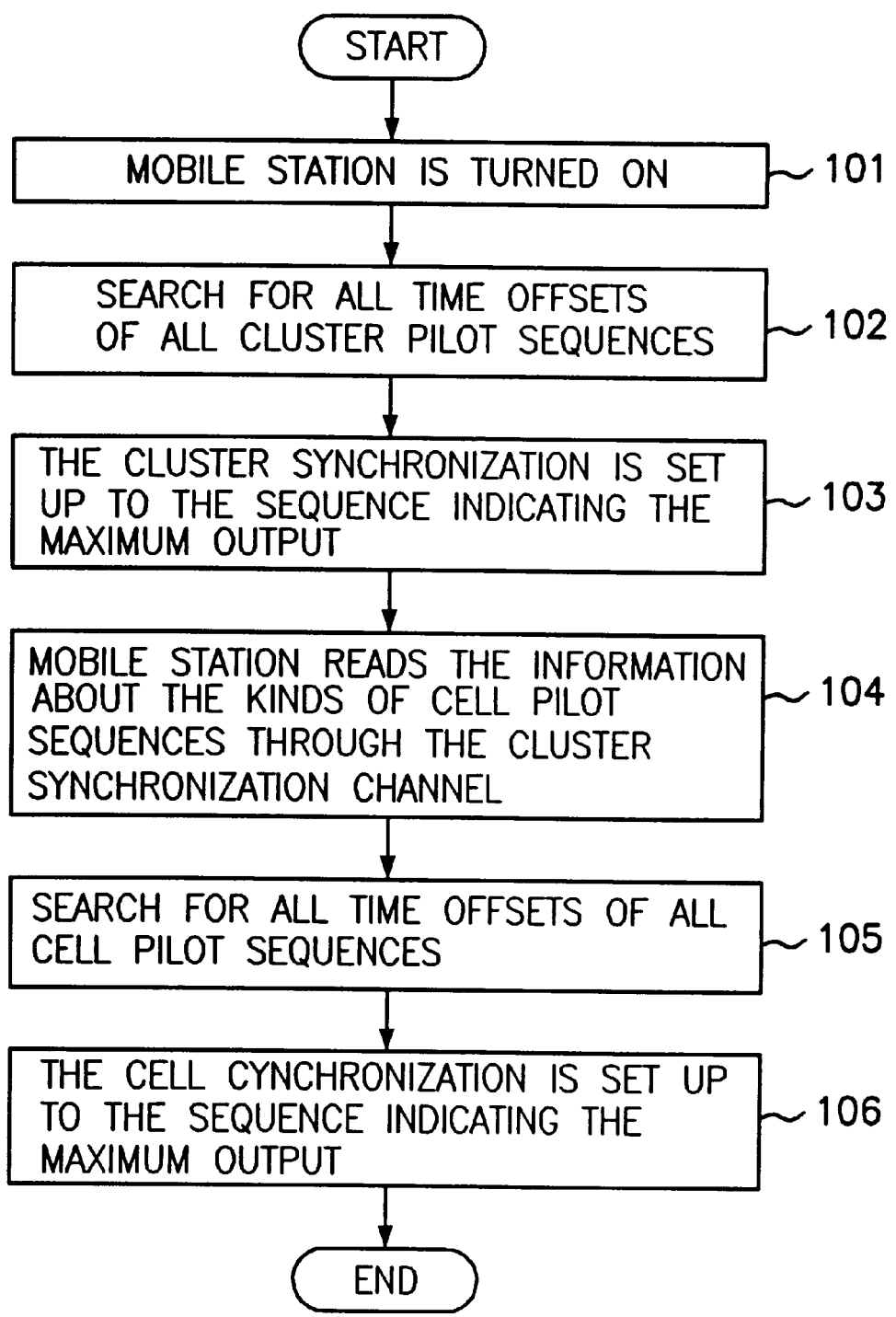
FIG. 10 is a flow chart illustrating a cell access, in the case where a cluster pilot is transmitted in the center of the cluster, in accordance with another embodiment of the present invention.

FIG. 10 is a flow chart illustrating a cell access, in the case where a cluster pilot is transmitted in the center of the cluster, in accordance with another embodiment of the present invention.

To transmit the cluster pilot in the center of the cluster, a system, which transmits the cluster pilot in the center of the cluster, is set up or the cell in the center of the cluster transmits the cluster pilot.

As shown in FIG. 10, the power of the mobile station is turned on (at step 101) and the mobile station searches for all time offsets of the cluster pilot sequences (at step 102), so that a point of time of the current synchronization is set up to the sequence indicting the largest output (at step 103).

The cell pilot information, which includes information about the kinds of sequences in the cluster, is transmitted to the cluster synchronization channel.

Accordingly, the mobile station reads the information about the kinds of cell pilot sequences though the cluster synchronization channel (at step 104).

The mobile stations searches for all time offsets of all cluster pilot sequences in the cluster of which synchronization is set up, using this cell pilot information (at step 105), and then the cell synchronization is set up to the sequence indicating the maximum output (at step 106).

On the other hand, in the second method of the single cell structure, when the mobile station searches for the cluster pilots, all cells in one cluster generate the cluster pilot and the cell pilot at the time offsets different from each other so that the cluster pilots and the cell pilot are transmitted at different points of time. Accordingly, in the case where a plurality of paths are obtained several times, the synchronization is set up by the largest path and the mobile station reads the cluster synchronization channel. All cells in the cluster have the same synchronization channel information.

Figure 11:
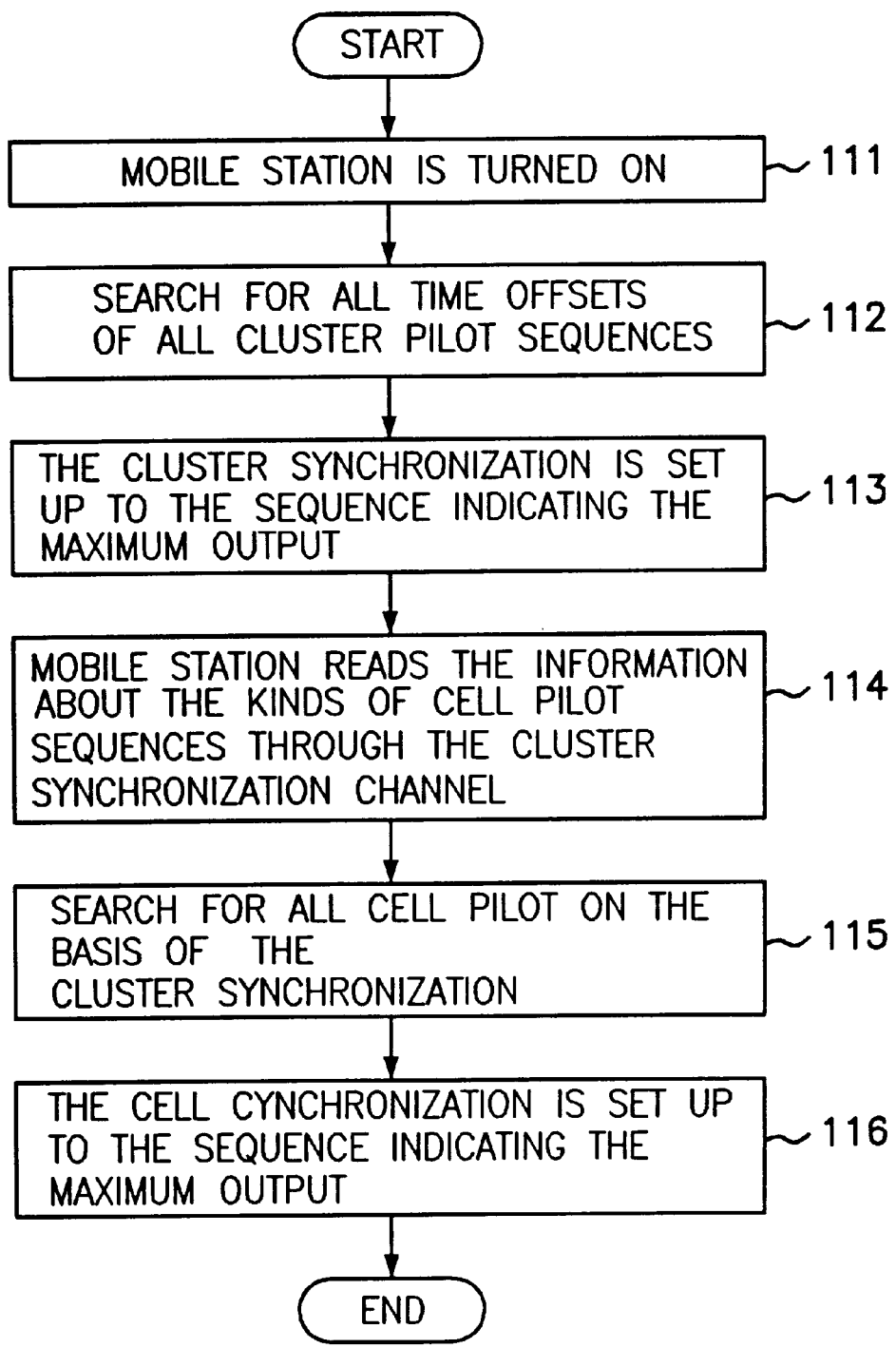
FIG. 11 is a flow chart illustrating a cell access, in the case where all cells transmit a cluster pilot and a cell cluster, in accordance with another embodiment of the present invention.

FIG. 11 is a flow chart illustrating a cell access, in the case were all cells transmit a cluster pilot and a cell cluster, in accordance with another embodiment of the present invention.

As shown in FIG. 11, the power of the mobile station is turned on (at step 111) and the mobile station searches for all time offsets of the cluster pilot sequence (at step 112), so that a point of time of the current synchronization is set up to the sequence indicating the largest output (at step 113). That is, since all cells transmit the cluster pilot, the outputs, which are due to some time offsets, can be over a predetermined value with respect to the one cluster sequence. Therefore, the mobile station must search for all time offsets with respect to each cluster sequence The cell pilot information, which includes information about the kinds of the sequences in the cluster, is transmitted to the cluster synchronization channel.

Accordingly, the mobile station reads the information about the kinds of cell pilot sequences though the cluster synchronization channel (at step 114).

The mobile station searches for all time offsets of the cluster pilot sequence in the cluster of which synchronization is set up, using this cell pilot information (at step 115), and then the cell synchronization is set up to the sequence indicating the maximum output (at step 116). At this time, in the case where all cells transmit the cluster pilot and cell pilot, the mobile station may search for only the cell pilots in the cluster which has been already synchronized with the mobile station.

As apparent from the above, the present invention has effects on the cost-cutting in establishing the base station because the expensive GPS equipment is not used. Also, because the expensive GPS equipment is not used, it is possible to set up the base station in an underground space and room. Further, the base station in accordance with the present invention can be managed independently of an external systems such as the GPS.

Although the preferred embodiments of the invention have been disclosed for illustrative purposes, those skilled in the art will appreciated that various modifications, additions and substitutions are possible, without departing from the scope and spirit of the invention as disclosed in the accompanying claims.

What is claimed is:

1. In a CDMA communication system including base stations, a base station controller and mobile stations, and discriminating the base stations by using different sequences, wherein the base station receives a synchronization signal from the base station controller, a method for accessing a cell, the method comprising the steps of:

synchronizing the mobile station with a cluster pilot representing a cluster which is a group of cells; and searching for cell pilots each representing a cell on the basis of the cluster synchronization channel set up by the cluster pilot, and synchronizing the mobile station with the cell pilot having a maximum sensitivity, whereby the mobile station is synchronized with the base station through the cluster pilot and the cell pilot.

2. In a CDMA communication system with a multi-layer structure, wherein the system includes base stations, a base station controller and mobile stations, and discriminates the base stations using different sequences, and wherein the base station receives a synchronization signal from the base station a controller, a method for accessing a cell in the mobile stations, the method comprising the steps of:

searching for cluster pilot sequences each representing a cell which is a group of cells until an output from a correlator is larger than a predetermined value, and searching for the remaining cluster pilot sequences on the basis of a current synchronization so that the mobile station sets up a cluster synchronization to the cluster pilot sequence having a maximum sensitivity;

reading a cluster synchronization channel set up by the cluster pilot sequence indicating the maximum sensitivity, and then reading cell pilot sequences each representing cells included in and a frequency band allocated to a cell pilot; and searching for cell pilot sequences on the basis of the cluster synchronization channel so that the mobile station sets up a cell synchronization to the cell pilot sequence having a maximum sensitivity.

3. In a CDMA communication system including base stations, a base station controller and mobile stations, and discriminating the base stations using different sequences, wherein the base station receives a synchronization signal from the base station controller, and wherein the system transmits cluster pilots representing a cluster which is a group of cells in a center of the cluster, a method for accessing a cell in said mobile stations, the method comprising the steps of:

searching for cluster pilot sequences until an output from a correlator is larger than a predetermined value, and searching for the remaining cluster pilot sequences on the basis of a current synchronization so that the mobile station sets up a cluster synchronization of the cluster pilot sequence having a maximum sensitivity;

reading a cluster synchronization channel set up by the cluster pilot sequence indicating the maximum sensitivity, and then reading cell pilots; and searching for cell pilot sequences each representing a cell on the basis of the cluster synchronization so that the mobile station sets up a cell synchronization to the cell pilot sequence having a maximum sensitivity.

4. In a CDMA communication including base stations, a base station controller and mobile stations, and discriminating the base stations using different sequences, wherein the base station receives a synchronization signal from the base station controller, and wherein all cells of the base stations transmit cluster pilot and cell pilots, the mobile stations for accessing a cell, a method for accessing a cell in the mobile stations, the method comprising the steps of:

searching for cluster pilot sequences each representing a cluster which is a group of cells so that the mobile station sets up a point of time of a synchronization to the cluster pilot sequence having a maximum sensitivity, and searching for the remaining cluster pilot sequences on the basis of a current synchronization so that the mobile station sets up a cluster synchronization to the cluster pilot sequence having a maximum sensitivity;

reading a cluster synchronization channel set up by the cluster pilot sequence indicating the maximum sensitivity, and then reading cell pilot sequences; and searching for cell pilot sequences each representing a cell on the basis of the cluster synchronization so that the mobile station sets up a cell synchronization to the cell pilot sequence having a maximum sensitivity.

5. In a CDMA communication system including base stations, a base station controller and mobile stations, and discriminating the base stations using different sequences, a method for accessing a cell, the method comprising the steps of:

synchronizing the mobile station with a cluster pilot representing a cluster which is a group of cells; and searching for all cell pilots each representing a cell in the cluster of which synchronization has been set up by the cluster pilot, and synchronizing the mobile station with the cell pilot having a maximum sensitivity, whereby the mobile station is synchronized with the base station through the cluster pilot and the cell pilot.

6. In a CDMA communication system with a multi-layer structure, wherein the system includes base stations, a base station controller and mobile stations, and discriminates the base stations using different sequences, the mobile stations for accessing a cell, a method for accessing a cell in the mobile stations, the method comprising the steps of:

search for all cluster pilot sequences each representing a cluster which is a group of cells so that the mobile station sets up a cluster synchronization to the cluster pilot sequence having a maximum sensitivity;

reading a cluster synchronization channel set up by the cluster pilot sequence indicating the maximum sensitivity, and then reading cell pilot sequences and a frequency band allocated to a cell pilot; and searching for all cell pilot sequences each representing a cell in a cluster of which synchronization is set up so that the mobile station sets up a cell synchronization to the cell pilot sequence having a maximum sensitivity.

7. In a CDMA communication system including base stations, a base station controller and mobile stations, and discriminating the base stations using different sequences, wherein the base station receives a synchronization signal from the base station controller, and wherein the system transmits cluster pilots in a center of a cluster, a method for accessing a cell in the mobile stations, the method comprising the steps of:

searching for all cluster pilot sequences each representing a cluster which is a group of cells so that the mobile station sets up a cluster synchronization to the cluster pilot sequence having a maximum sensitivity;

reading a cluster synchronization channel set up by the cluster pilot sequence indicating the maximum sensitivity, and then reading cell pilot sequences and a frequency band allocated to a cell pilot; and searching for all cell pilot sequences each representing a cell in a cluster of which synchronization is set up so that the mobile station sets up a cell synchronization to the cell pilot sequence having a maximum sensitivity.

8. In a CDMA communication system including base stations, a base station controller and mobile stations, and discriminating the base stations using different sequences, wherein the base station receives a synchronization signal from the base station controller, and wherein all cells of the base stations transmit cluster pilots each representing a cluster which is a group of cells and cell pilots each representing a cell, the mobile stations for accessing a cell, a method for accessing a cell in said mobile stations, the method comprising the steps of:

searching for all cluster pilot sequences so that the mobile station sets up a cluster synchronization to the cluster pilot sequence having a maximum sensitivity;

reading a cluster synchronization channel set up by the cluster pilot sequence indicating the maximum sensitivity, and then reading cell pilot sequences and a frequency band allocated to a cell pilot; and searching for all cell pilot sequences in a cluster of which synchronization is set up so that the mobile station sets up a cell synchronization to the cell pilot sequence having a maximum sensitivity.

9. In a CDMA communication system including base stations, a base station controller and mobile stations, and discriminating the base station by using different sequences, a method for accessing a cell, the method comprising the step of:

transmitting two pilots, wherein a first pilot represents a cluster which is a group of cells and a second pilot represents a cell.

10. In a CDMA communication system including base stations, a base station controller and mobile stations, and discriminating the base station by using different sequences, a method for accessing a cell, the method comprising the steps of:

grouping at least two cells as a cluster;

synchronizing a mobile station with a cluster pilot representing a cluster which is a group of cells; and searching for all cell pilots each representing a cell included in the cluster of which synchronization has been set up by the cluster pilot, and synchronizing the mobile station with the cell pilot having a maximum sensitivity.

11. In a CDMA communication system including base stations, a base station controller and mobile stations, and discriminating the base station by using different sequences, a method for accessing a cell, the method comprising the steps of:

transmitting, at the base station, a cluster pilot channel and a cell pilot channel, wherein the cluster pilot channel represents a cluster which is a group of cells and the cell pilot channel represents a cell;

synchronizing a mobile station with said cluster pilot; and searching for all of the cell pilots included in said cluster of which synchronization has been set up by said cluster pilot, and synchronizing the mobile station with the cell pilot having maximum sensitivity.

* * * * *

UNITED STATES PATENT AND TRADEMARK OFFICE
CERTIFICATE OF CORRECTION

PATENT NO. : 6,205,132 B1
DATED : March 20, 2001
INVENTOR(S) : Hong et al.

It is certified that error appears in the above-identified patent and that said Letters Patent is hereby corrected as shown below:

Column 10, claim 2,
Line 29, delete "station a controller" and insert -- station controller --.

Column 12, claim 11,
Line 61, delete "said cluster" and insert -- the cluster --.
Line 63, delete "set up by said" and insert -- set up by the --.

Signed and Sealed this

Twenty-sixth Day of February, 2002

Attest:

JAMES E. ROGAN
Attesting Officer
Director of the United States Patent and Trademark Office